(12) United States Patent
Serghine et al.

(10) Patent No.: US 10,686,358 B2
(45) Date of Patent: Jun. 16, 2020

(54) MAGNETOHYDRODYNAMIC GENERATOR

(71) Applicant: Safran Helicopter Engines, Bordes (FR)

(72) Inventors: Camel Serghine, Boeil-bezing (FR); Thomas Klonowski, Sedzere (FR); Stéphane Beddok, Pau (FR); Stéphane Richard, Boeil-bezing (FR)

(73) Assignee: Safran Helicopter Engines, Bordes (FR)

( * ) Notice: Subject to any disclaimer, the term of this patent is extended or adjusted under 35 U.S.C. 154(b) by 89 days.

(21) Appl. No.: 15/756,816

(22) PCT Filed: Sep. 1, 2016

(86) PCT No.: PCT/FR2016/052163
§ 371 (c)(1),
(2) Date: Mar. 1, 2018

(87) PCT Pub. No.: WO2017/037388
PCT Pub. Date: Mar. 9, 2017

(65) Prior Publication Data
US 2018/0254693 A1    Sep. 6, 2018

(30) Foreign Application Priority Data

Sep. 4, 2015 (FR) ...................... 15 58232

(51) Int. Cl.
*H02K 44/10* (2006.01)
*H02K 44/12* (2006.01)
(Continued)

(52) U.S. Cl.
CPC ............ *H02K 44/12* (2013.01); *F01D 15/10* (2013.01); *H02K 44/08* (2013.01); *H02K 44/10* (2013.01);
(Continued)

(58) Field of Classification Search
CPC ........ H02K 44/12; H02K 44/10; H02K 44/08; H02K 44/28; F01D 15/10; F05D 2220/76; B64C 27/04
(Continued)

(56) References Cited

U.S. PATENT DOCUMENTS 3,660,700 A * 5/1972 Aisenberg .............. H02K 44/18
310/11
3,678,306 A * 7/1972 Garnier .................... F02C 7/04
310/11
(Continued)

FOREIGN PATENT DOCUMENTS

CN        1299927 A     6/2001
CN      101629642 A     1/2010
(Continued)

OTHER PUBLICATIONS

International Search Report and Written Opinion with English translation dated Oct. 26, 2016, in corresponding International Application No. PCT/FR2016/052163 (11 pages).

*Primary Examiner* — John K Kim
(74) *Attorney, Agent, or Firm* — Bookoff McAndrews, PLLC

(57) ABSTRACT

The invention relates to the field of magnetohydrodynamic generators, and more precisely to such a generator (10) comprising a working fluid flow passage (11) that is defined by a first wall (12) and a second wall (13), an ionizing device (14) for ionizing the working fluid, a pair of arms (15), each connecting together the first and second walls (12, 13) downstream from said ionizing device (14) so as to define, within the flow passage (11), a channel (16) between said arms (15) and said walls (12, 13), said channel (16) being arranged to be traversed by a portion of the working fluid after it has been ionized, a magnet for generating a magnetic field (B) oriented in a direction that is perpendicular to the (Continued)

flow of the working fluid through the channel (16) defined by the pair of arms (15) and said walls (12, 13), and at least one pair of electrodes (17), each of the electrodes (17) in each pair being arranged on a respective side of the channel (16) defined by the pair of arms (15) and said walls (12, 13), said electrodes (17) in each pair being spaced apart from each in a direction that is perpendicular to said magnetic field (B) and to the flow direction of the working fluid through the channel (16) defined by the pair of arms (15) and by said walls (12, 13).

15 Claims, 4 Drawing Sheets

(51) Int. Cl.
      *F01D 15/10*       (2006.01)
      *H02K 44/08*       (2006.01)
      *H02K 44/28*       (2006.01)
      *B64C 27/04*       (2006.01)

(52) U.S. Cl.
    CPC .............. *H02K 44/28* (2013.01); *B64C 27/04* (2013.01); *F05D 2220/76* (2013.01)

(58) Field of Classification Search
    USPC .......................................................... 310/11
    See application file for complete search history.

(56) References Cited

U.S. PATENT DOCUMENTS

| | | | | |
|---|---|---|---|---|
| 4,450,361 | A * | 5/1984 | Holt ........................ | F02C 1/00 290/1 R |
| 4,785,209 | A * | 11/1988 | Sainsbury ............ | H02K 44/085 310/11 |
| 5,219,672 | A * | 6/1993 | Ramsey, Jr. ............ | H01M 2/22 429/405 |
| 6,644,014 | B2 * | 11/2003 | Provitola ................ | F03H 99/00 60/202 |
| 7,166,927 | B2 * | 1/2007 | Koslover ............ | H02K 44/085 290/1 R |
| 8,720,205 | B2 * | 5/2014 | Lugg ........................ | F01D 5/03 60/767 |
| 10,056,817 | B2 * | 8/2018 | Sirous ........................ | F02C 3/16 |
| 10,132,188 | B2 * | 11/2018 | Hiernaux ................ | F01D 15/10 |
| 2009/0230810 | A1 * | 9/2009 | Sugiura ........................ | H01F 5/02 310/215 |
| 2016/0172955 | A1 * | 6/2016 | Sirous ........................ | F01D 1/32 310/11 |
| 2018/0254693 | A1 * | 9/2018 | Serghine ................ | H02K 44/10 |

FOREIGN PATENT DOCUMENTS

| | | |
|---|---|---|
| CN | 103117640 A | 5/2013 |
| FR | 2085190 | 12/1971 |
| GB | 1078332 A | 8/1967 |

\* cited by examiner

MAGNETOHYDRODYNAMIC GENERATOR

CROSS-REFERENCE TO RELATED APPLICATIONS

This application is the U.S. national phase entry under 35 U.S.C. § 371 of International Application No. PCT/FR2016/052163, filed on Sep. 1, 2016, which claims priority to French Patent Application No. 1558232, filed on Sep. 4, 2015, the entireties of each of which are herein incorporated by reference.

BACKGROUND OF THE INVENTION

The present invention relates to the field of magnetohydrodynamics, and in particular to its use for recovering at least a portion of the residual energy in the working fluid of a turbine.

The term "turbine" is used to designate a rotary device that is designed to use the energy of a working fluid in order to cause a rotary shaft to rotate. The energy of the working fluid, characterized by its speed and its enthalpy is thus converted in part into mechanical energy that can be extracted by the rotary shaft. Nevertheless, downstream from the turbine, the working fluid usually retains a large amount of residual energy. In the description below, the terms "upstream" and "downstream" are defined relative to the normal flow direction of the working fluid.

French patent application FR 2 085 190 already proposes using a magnetohydrodynamic generator in addition to a turbine for the purpose of recovering the energy contained in the working fluid of the turbine. In such a magnetohydrodynamic generator, the flow of an ionized fluid, when subjected to a magnetic field in a direction perpendicular to the flow of the ionized fluid, generates an electric current between two electrodes that are spaced apart from each other in another direction that is perpendicular both to the flow of the ionized fluid and also to the magnetic field.

Nevertheless, in practice, integrating such a magnetohydrodynamic generator in a turbine is not without drawbacks, in particular concerning the arrangement of the electrodes and the means for generating the magnetic field in a flow passage for the working fluid of the turbine.

OBJECT AND SUMMARY OF THE INVENTION

The present disclosure seeks to remedy those drawbacks by proposing a magnetohydrodynamic generator that can be integrated more simply in an assembly including a turbine that is to be driven by the same working fluid.

In at least one embodiment, this object is achieved by the fact that the magnetohydrodynamic generator, which comprises both a working fluid flow passage that is defined by a first wall and a second wall, and an ionizing device for ionizing the working fluid, also additionally comprises at least one pair of arms, each connecting together the first and second walls downstream from said ionizing device so as to define, within the flow passage, a channel between said arms and said walls, said channel being arranged to be traversed by a portion of the working fluid after it has been ionized, a magnet for generating a magnetic field oriented in a direction that is perpendicular to the flow of the working fluid through the channel defined by the pair of arms and said walls, and at least one pair of electrodes, each of the electrodes in each pair being arranged on a respective side of the channel defined by the pair of arms and said walls, the electrodes in each pair being spaced apart from each other in a direction that is perpendicular to said magnetic field and to the flow direction of the working fluid through the channel defined by the pair of arms and by said walls. The magnet may be an electromagnet, optionally having a solenoid that may advantageously be of conductivity that is improved by integrating a carbon nanotube in the core of the conductor, or indeed by being superconductive, but it could also be a permanent magnet. In either situation, it could have a core that is laminated.

By means of these provisions, it is made easier to arrange the electrodes and the poles of the magnet along two axes that are substantially mutually perpendicular and perpendicular relative to the flow of the working fluid. In addition, it is possible to generate electricity from a portion only of the working fluid of a turbine, as may be desirable for example if the turbine is to deliver a relatively large amount of mechanical power, while the magnetohydrodynamic generator is for supplying significantly smaller amounts of electric power, for auxiliary purposes.

In particular, each electrode of each pair of electrodes may be arranged on a respective arm of said pair of arms. Under such circumstances, in order to generate a magnetic field perpendicular to the flow of working fluid in the direction in which the electrodes are spaced apart from each other, the magnet may include a core housed inside one of said arms. Nevertheless, it is also possible to envisage an alternative arrangement in which each electrode of each pair is arranged on a respective one of the walls defining the flow passage, with the magnet then being arranged to generate a magnetic field that is oriented in the direction in which the arms are spaced apart from each other.

In order to accelerate the flow of fluid in the channel defined by the walls and the arms, thereby increasing the efficiency of the magnetohydrodynamic generator, the first and second walls may converge towards each other in the flow direction of the combustion gas over at least a first segment of the flow passage situated upstream from said pair of arms. Under such circumstances, and in order to avoid a large amount of reaction thrust, in particular when the magnetohydrodynamic generator is installed in an outlet nozzle of a turboshaft engine, in particular a turboshaft engine of a rotary wing aircraft, the first and second walls may diverge from each other in the flow direction of the working fluid over at least one second segment of the flow passage situated downstream from said pair of arms, so as to reduce the flow speed once more.

In order to ensure effective ionization of the working fluid, and in particular of a gaseous working fluid, said ionizing device may be in the form of a plasma torch. Such a plasma torch may comprise in particular a pair of electrodes connected to a device for generating a direct current (DC) or an alternating current (AC) electric potential between the electrodes of this pair, which potential is greater than or equal to the ionizing potential of the working fluid. Nevertheless, other types of ionizing device can also be envisaged, such as for example a device for ionizing by injecting microwaves, by helicon discharge, or by inductive coupling. Furthermore, in order to facilitate ionizing the working fluid, the generator may include a device for injecting elements of low ionization potential upstream from said ionizing device, optionally together with a filter for recovering the elements of low ionization potential downstream from the channel defined by the walls and the arms.

Relatively short distances between the opposite magnetic poles and electrodes in the channel defined by the pair of arms and the walls may be advantageous for the yield and the efficiency of the magnetohydrodynamic generator. In order to increase the quantity of working fluid used for magnetohydrodynamic generation, while limiting dimensions, the generator may include a plurality of pairs of arms, each connecting together the first and second walls downstream from said ionizing device, and for each pair of arms, it may include a respective magnet and a pair of electrodes. By splitting the magnetohydrodynamic generation of electricity among a plurality of channels, it is possible to increase electrical power while maintaining a small flow section for each channel. The pairs of electrodes in each channel may be connected together electrically in series or in parallel.

In order to adapt the magnetohydrodynamic generator more easily to a turbine, the flow passage may be annular, said first and second walls being coaxial about a central axis of the flow passage, and said arms being radial.

The present disclosure also relates to a turbine engine including such a magnetohydrodynamic generator, and at least one turbine arranged to be driven by the same working fluid as the magnetohydrodynamic generator. By way of example, the magnetohydrodynamic generator may be used for recovering at least a portion of the residual energy of the working fluid that cannot be used by the turbine. The turbine engine may in particular include a combustion chamber upstream from the turbine and from the magnetohydrodynamic generator, in order to produce combustion gas of high enthalpy forming the working fluid of the turbine and of the magnetohydrodynamic generator downstream therefrom and having high temperatures that facilitate ionization. Furthermore, in order to increase the enthalpy of the combustion gas and drive its flow, the turbine engine may include at least one compressor upstream from the combustion chamber and a first turbine that is coupled to said compressor via a first rotary shaft in order to drive it. It may also include a second turbine. Under such circumstances, the second turbine, which may in particular be situated downstream from the first turbine but also upstream from the magnetohydrodynamic generator, may be coupled to an outlet shaft in order to form a turboshaft engine, such as for example a turboshaft engine for a rotary wing aircraft.

In order to be able to make better use of the residual energy of the working fluid that cannot be used by the turbine, the magnetohydrodynamic generator may be arranged in an outlet nozzle downstream from the turbine.

The present disclosure also provides a magnetohydrodynamic method of generating electricity, wherein a working fluid is ionized at least in part by an ionizing device in a flow passage defined by first and second walls, and an ionized portion of the working fluid passes through a channel defined in the flow passage by said walls and by a pair of arms, each connecting together the first and second walls downstream from said ionizing device, and is subjected to a magnetic field generated by a magnet, the field extending in the channel in a direction perpendicular to the flow of the working fluid so as to generate an electric current between the electrodes of at least one pair of electrodes, each of the electrodes of each pair being arranged on a respective side of the channel defined by the pair of arms and said walls, the electrodes of each pair being spaced apart from each other in a direction that is perpendicular both to said magnetic field and to the flow of combustion gas in the channel. This magnetohydrodynamic method of generating electricity may be used in particular for recovering the residual energy of a working fluid that has previously been used for driving at least one turbine. In particular, on board a vehicle propelled by a turbine engine, the magnetohydrodynamic method may serve to generate the electricity that is used for powering auxiliary equipment of the vehicle other than the turbine engine.

BRIEF DESCRIPTION OF THE DRAWINGS

The invention can be well understood and its advantages appear more clearly on reading the following detailed description of embodiments given as non-limiting examples. The description refers to the accompanying drawings, in which.

DETAILED DESCRIPTION OF THE INVENTION

Figure 1:
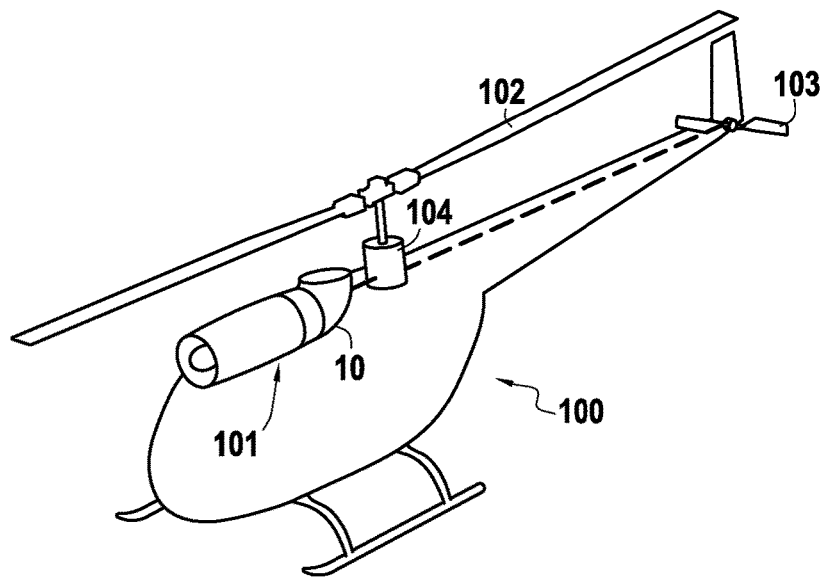
FIG. 1 is a diagrammatic perspective view of a rotary wing aircraft with a turboshaft engine having an embodiment of a magnetohydrodynamic generator.

FIG. 1 shows a rotary wing aircraft, more precisely a helicopter 100, having a turboshaft engine 101 for driving its main rotor 102 and its tail rotor 103 via a transmission 104. The engine 101 includes an embodiment of a magnetohydrodynamic generator 10 for supplying electricity to the various electricity-consuming pieces of equipment on board the helicopter 1.

Figure 2:
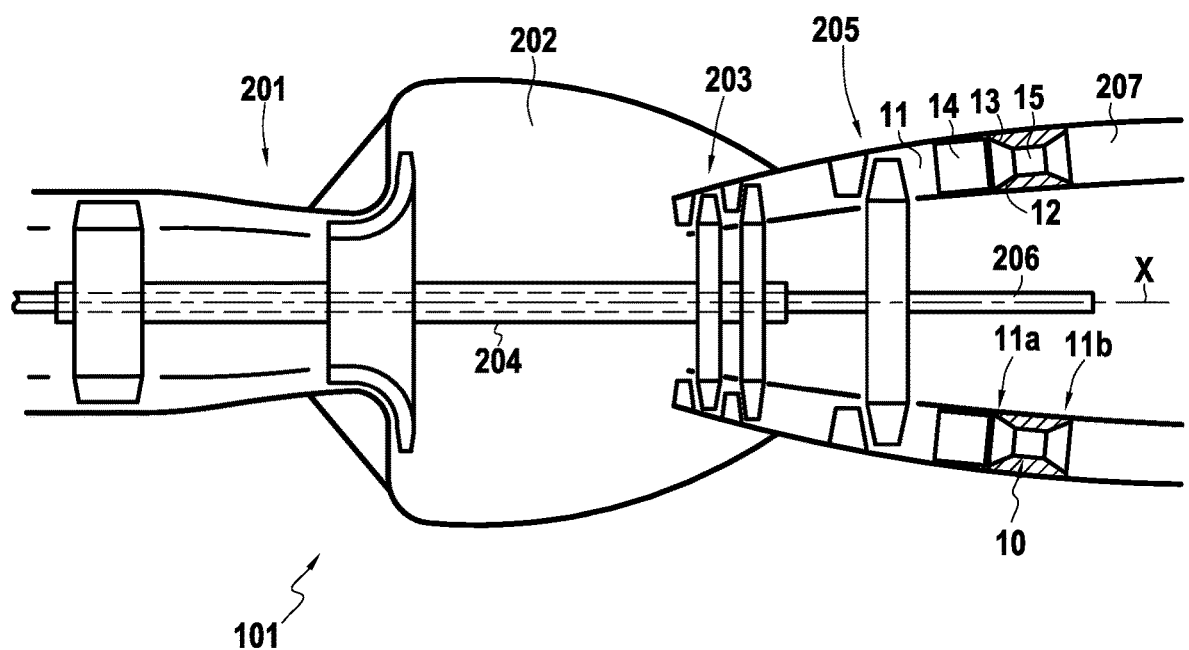
FIG. 2 is a diagrammatic longitudinal section view of the FIG. 1 engine.

As shown in greater detail in FIG. 2, the engine 101 comprises a gas generator with, in the air flow direction: a compressor 201; a combustion chamber 202 having an igniter and injectors connected to a fuel supply system (not shown); and a first turbine 203 coupled to the compressor 201 via a first rotary shaft 204. Downstream of this first turbine 203, the engine 101 has a second turbine 205 coupled to a second rotary shaft 206, which in the helicopter 1 is suitable for coupling to the transmission 104 in order to drive the rotors 102 and 103. Finally, downstream from the second turbine 205, the engine includes a combustion gas outlet nozzle 207.

In this first embodiment, the magnetohydrodynamic generator 10 is integrated in the nozzle 206 downstream from the turbines 203 and 205. Within this magnetohydrodynamic generator 10, the annular flow passage 11 for the combustion gas, which in this embodiment comprises the working fluid of the turbines 203 and 205 and also of the magnetohydrodynamic generator 10, is defined by an inner first wall 12 and an outer second wall 13 coaxial around the first wall 12 about the central axis X of the engine 101. The magnetohydrodynamic generator 10 also has a device 14 for ionizing the combustion gas. By way of example, the ionizing device 14 may be a plasma torch with two electrodes configured to create an electric field between them, which electric field is sufficiently powerful to be able to ionize the combustion gas flowing at high temperatures and speeds through the annular passage 11 in order to create an electrically conductive cold plasma. This strong electric field may be a DC field or an AC field, an AC field serving to avoid thermal imbalance in the cold plasma. In order to facilitate ionizing the combustion gas, the engine 101 may also include a device upstream from the ionizing device for injecting elements having a low ionization potential, such as potassium. The device for injecting elements having a low ionization potential may in particular be integrated in the fuel supply circuit, so that the elements having a low ionization potential are injected into the combustion chamber 202 together with the fuel.

Over a first segment 11a of the annular combustion gas flow passage 11 through the magnetohydrodynamic generator 10, the walls 12 and 13 converge in the combustion gas flow direction so as to accelerate the flow, while over a second segment 11b, these walls 12 and 13 diverge once more in the combustion gas flow direction so as to reduce its flow speed prior to leaving the nozzle 207. Between the converging segment 11a and the diverging segment 11b, pairs of radial arms 15 connect together the walls 12 and 13 so as to form channels 16 in the passage 11, each channel 16 being defined by the walls 12 and 13 and by the arms 15 of a pair. In order to ensure that the elements having low ionization potential that have been injected upstream are not subsequently expelled to the outside, the generator 10 may also include a filter (not shown) for recovering the elements of low ionization potential downstream from the channels 16.

Figure 3A:
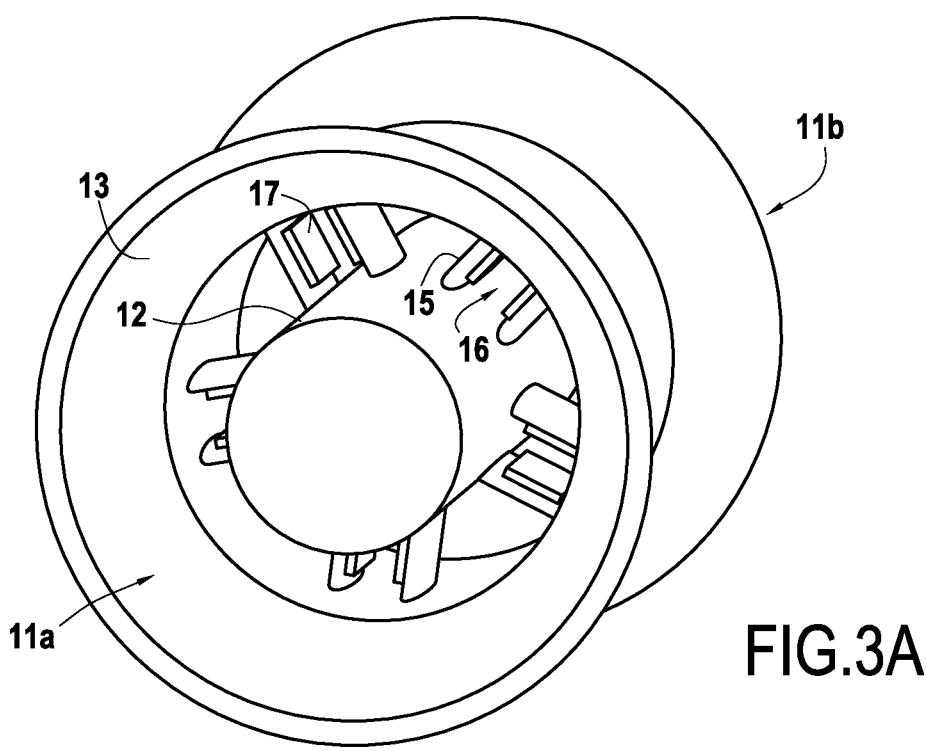
FIG. 3A is a diagrammatic perspective view of a portion of the magnetohydrodynamic generator of the FIG. 2 engine.
Figure 3B:
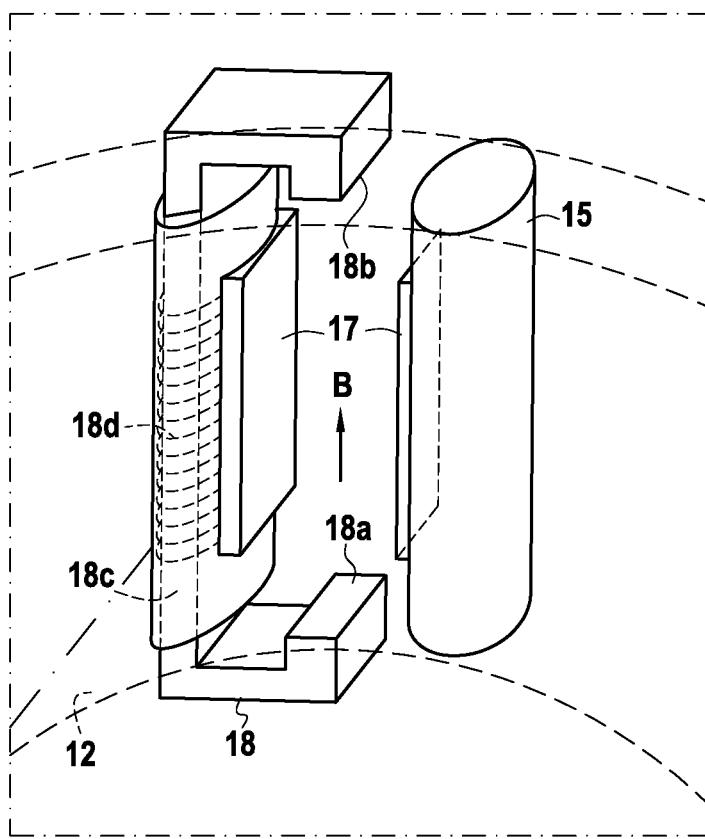
FIG. 3B shows a detail of FIG. 3A.

In the embodiment shown in greater detail in FIGS. 3A and 3B, the magnetohydrodynamic generator 10 comprises, for each channel 16, at least one electrode 17 mounted on an inside face of each of the arms 15 defining the channel 16, so as to be exposed to the ionized combustion gas passing through the channel 16, and also an electromagnet 18 having radially opposite poles 18a and 18b covered respectively by the inner wall 12 and by the outer wall 13 on opposite sides of the channel 16, and connected together by a core 18c housed in one of the arms 15, the core being laminated and surrounded by a solenoid 18d so as to generate a magnetic field B in the channel 16 that is oriented in a radial direction and thus substantially perpendicularly to the flow of ionized combustion gas in the channel 16. In order to generate a particularly powerful magnetic field, the solenoid 18d may in particular be superconducting.

Thus, in this embodiment, the flow of ionized combustion gas through each channel 16 that is subjected to the magnetic field B generated by the electromagnet 18 can generate an electromotive force and thus an electric current between the electrodes 17 situated on either side of the channel 16 and thus facing each other in a direction that is perpendicular both to the flow direction and to the direction of the magnetic field B.

Figure 4:
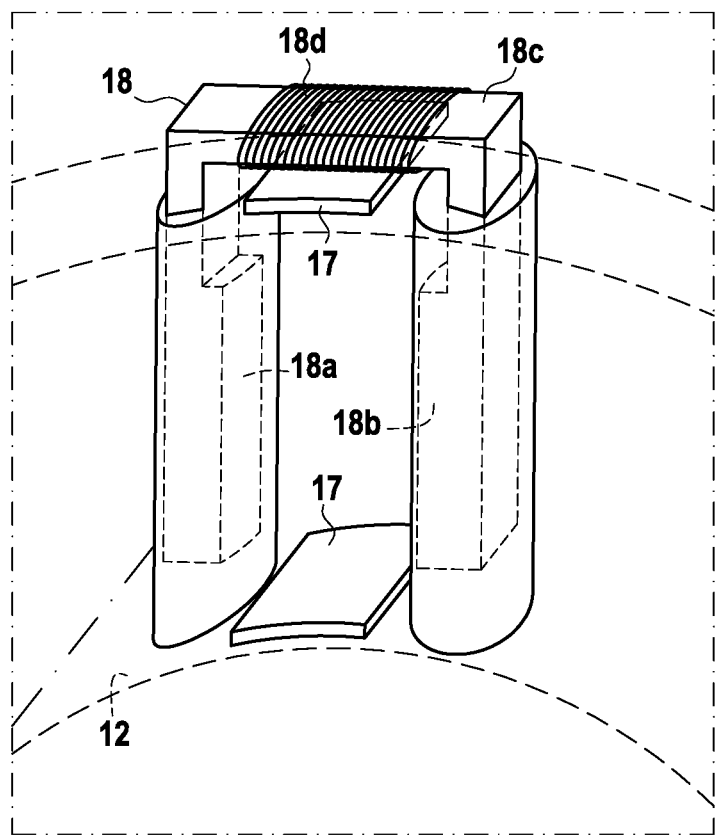
FIG. 4 is a diagrammatic perspective view of a magnetohydrodynamic generator in a second embodiment.

In an alternative embodiment, as shown in FIG. 4, the arrangement of the walls 12 and 13, of the arms 15, and also of the channels 16 is identical. Nevertheless, the electrodes 17 corresponding to each channel 16 are not mounted on the arms 15 but on the inside faces of the walls 12 and 13 so as to be exposed to the channel 16, being radially opposite each other, while the electromagnet 18 is arranged to generate a magnetic field B that is oriented in a direction that is substantially perpendicular to the radial direction and to the flow direction of the ionized combustion gas. The other elements of the magnetohydrodynamic generator 10 are analogous to those of the first embodiment and they are given the same references in the drawing.

Figure 5:
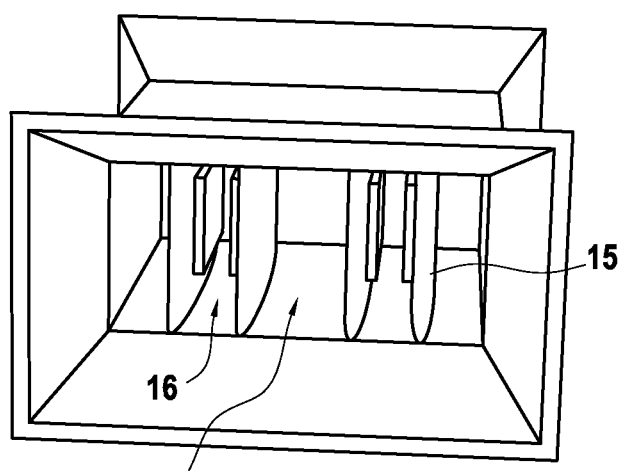
FIG. 5 is a diagrammatic perspective view of a magnetohydrodynamic generator in a third embodiment.

Although the flow passage 11 is annular in both of these embodiments, in order to facilitate integrating the magnetohydrodynamic generator 10 in the engine 101, it is possible to envisage other shapes, e.g. to integrate the magnetohydrodynamic generator 10 in a flat nozzle. Thus, in another alternative embodiment, shown in FIG. 5, the flow passage 11 is rectangular in section, while the magnetohydrodynamic generator in this third embodiment is in all other respects analogous to that of the first embodiment, with equivalent elements being given the same references in this figure.

Figure 6:
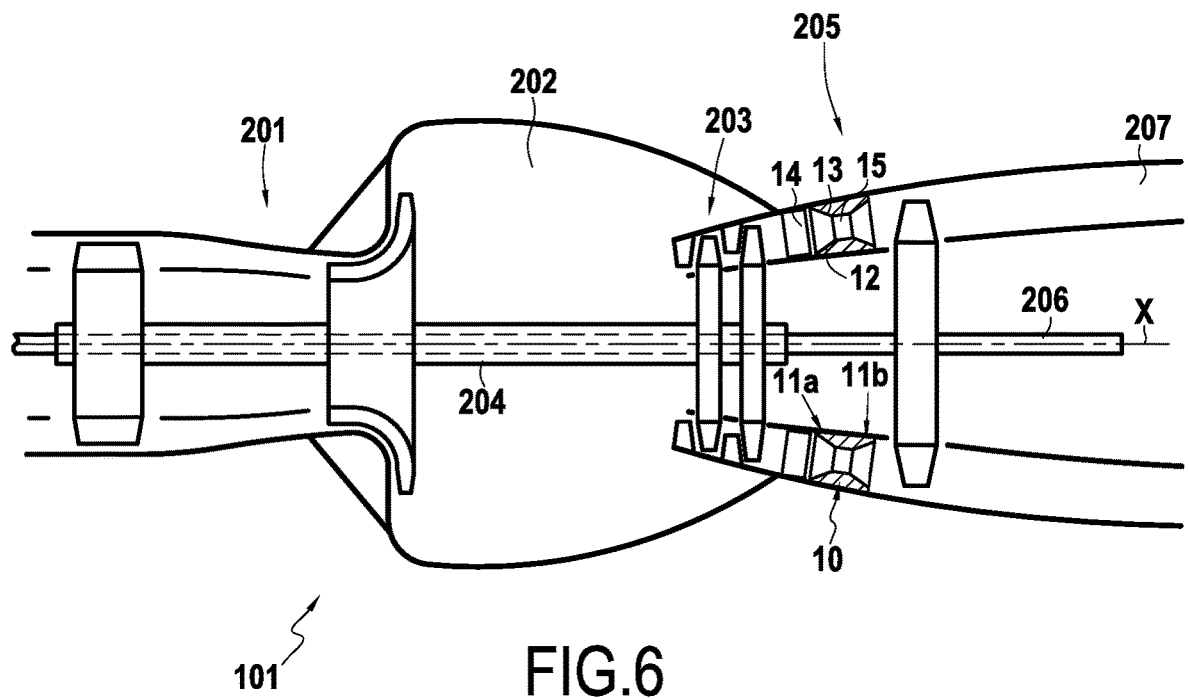
FIG. 6 is a diagrammatic longitudinal section view of a turboshaft engine in a fourth embodiment.
Figure 7:
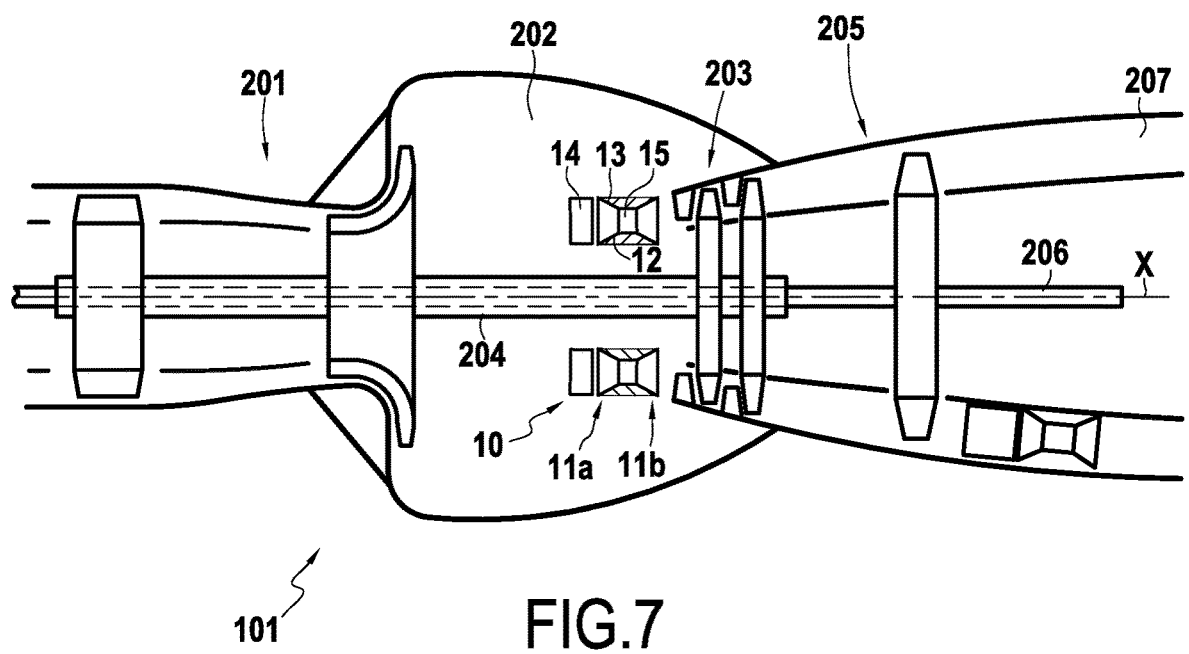
FIG. 7 is a diagrammatic view of a turboshaft engine in a fifth embodiment.

Although in the first embodiment the magnetohydrodynamic generator 10 is situated downstream from the two turbines 203 and 205, it is also possible to envisage situating them between the two turbines 203 and 205, as in the fourth embodiment shown in FIG. 6, or indeed immediately downstream from the combustion chamber 202, upstream from the two turbines 203 and 205, as in the fifth embodiment shown in FIG. 7. In both configurations, the elements of the magnetohydrodynamic generator 10 remain analogous to those of the first embodiment and they are given the same references in the figures.

The operation of the magnetohydrodynamic generator 10 in each of these embodiments is likewise similar. In each configuration, the combustion gas from the combustion chamber 202 is ionized at least in part by the ionizing device 14, is accelerated through the converging segment 11a in the flow passage 11, prior to penetrating into the channels 16 defined by each pair of arms 15, where it is subjected to the magnetic field B generated by the electromagnet 18 in a direction that is substantially perpendicular to the flow direction of the ionized combustion gas in each channel 16 so as to generate an electric current between the electrodes 17, which electric current may be used in particular for powering various devices on board the helicopter 1. On leaving the channels 16, the flow of combustion decelerates in the diverging segments 11b.

Although the present invention is described with reference to specific embodiments, it is clear that various modifications and changes may be undertaken on those examples without going beyond the general ambit of the invention as defined by the claims. For example, although in each of the embodiments shown, each channel 16 has only one pair of electrodes 17, it is also possible to envisage placing a plurality of pairs of electrodes in each channel, these pairs of electrodes possibly following one another in the flow direction of the working fluid, for example. Furthermore, the magnetohydrodynamic generators could be used in turbine engines of types other than the turboshaft engines shown. In addition, the individual characteristics of the various embodiments mentioned may be combined in additional embodiments. Consequently, the description and the drawings could be considered in a sense that is illustrative rather than restrictive.

The invention claimed is:

1. A magnetohydrodynamic generator comprising at least:
   a working fluid flow passage that is defined by a first wall and a second wall;
   an ionizing device for ionizing the working fluid;
   a first pair of arms, each connecting together the first and second walls downstream from said ionizing device so as to define, within the flow passage, a channel between the pair of arms and the first and second walls, the channel being arranged to be traversed by a portion of the working fluid after the working fluid has been ionized;
   a magnet for generating a magnetic field oriented in a direction that is perpendicular to the flow of the working fluid through the channel defined by the pair of arms and the first and second walls; and at least one pair of electrodes, each of the electrodes in each pair of electrodes being arranged on a respective side of the channel defined by the pair of arms and the first and second walls, the electrodes in each pair of electrodes being spaced apart from each other in a direction that is perpendicular to said magnetic field and to the flow direction of the working fluid through the channel defined by the pair of arms and by the first and second walls.

2. The magnetohydrodynamic generator according to claim 1, wherein each electrode of each pair of electrodes is arranged on a respective arm of the first pair of arms.

3. The magnetohydrodynamic generator according to claim 2, wherein the magnet includes a core housed inside one of the arms of the first pair of arms.

4. The magnetohydrodynamic generator according to claim 1, wherein the first and second walls converge towards each other in a flow direction of the working fluid over at least a first segment of the flow passage situated upstream from the first pair of arms.

5. The magnetohydrodynamic generator according to claim 4, wherein the first and second walls diverge from each other in the flow direction of the working fluid over at least one second segment of the flow passage situated downstream from the pair of arms.

6. The magnetohydrodynamic generator according to claim 1, wherein the ionizing device is in the form of a plasma torch.

7. The magnetohydrodynamic generator according to claim 1, including a device for injecting elements of low ionization potential upstream from the ionizing device.

8. The magnetohydrodynamic generator according to claim 1, including a plurality of pairs of arms, including the first pair of arms, each pair of arms of the plurality of pairs of arms connecting together the first and second walls downstream from the ionizing device, and including a respective magnet and at least one pair of electrodes.

9. The magnetohydrodynamic generator according to claim 1, wherein said flow passage is annular, said first and second walls being coaxial about a central axis of the flow passage, and said arms being radial.

10. A turbine engine including at least one magnetohydrodynamic generator according to claim 1, and at a first turbine arranged to be driven by the same working fluid as the magnetohydrodynamic generator.

11. The turbine engine according to claim 10, including a combustion chamber upstream from the first turbine and from the magnetohydrodynamic generator.

12. The turbine engine according to claim 11, including at least one compressor upstream from the combustion chamber and wherein the first turbine is coupled to the at least one compressor via a first rotary shaft in order to drive the at least one compressor.

13. The turbine engine according to claim 12, including a second turbine.

14. The turbine engine according to claim 10, wherein the magnetohydrodynamic generator is arranged in an outlet nozzle downstream from the first turbine.

15. A magnetohydrodynamic method of generating electricity, wherein:
  a working fluid is ionized at least in part by an ionizing device in a flow passage defined by first and second walls; and
  an ionized portion of the working fluid passes through a channel defined in the flow passage by the first and second walls and by a pair of arms, each arm of the pair of arms connecting together the first and second walls downstream from said ionizing device, and
  the ionized portion of the working fluid passing through the channel is subjected to a magnetic field generated by a magnet, the field extending in the channel in a direction perpendicular to the flow of the working fluid so as to generate an electric current between the electrodes of at least one pair of electrodes, each of the electrodes of each pair of electrodes being arranged on a respective side of the channel defined by the pair of arms and said walls, the electrodes of each pair of electrodes being spaced apart from each other in a direction that is perpendicular both to said magnetic field and to the flow of combustion gas in the channel.

* * * * *